(No Model.)
F. M. CASE & J. O. BOSWORTH.
Brick and other Presses.
No. 240,302. Patented April 19, 1881.
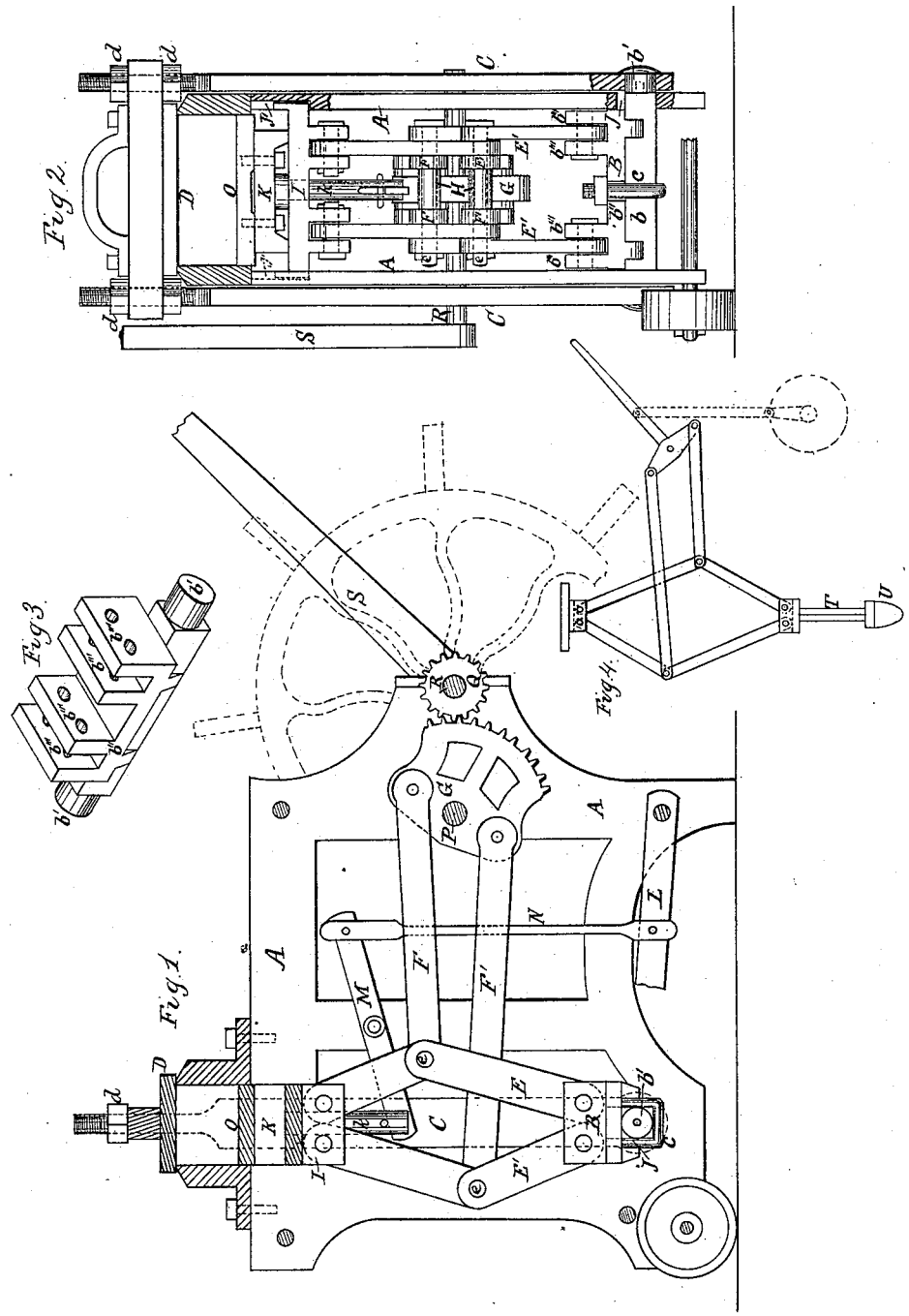

UNITED STATES PATENT OFFICE.

FRANCIS M. CASE AND JOAB O. BOSWORTH, OF DENVER, COLORADO.

BRICK AND OTHER PRESSES.

SPECIFICATION forming part of Letters Patent No. 240,302, dated April 19, 1881.

Application filed February 14, 1881. (No model.)

*To all whom it may concern:*

Be it known that we, FRANCIS M. CASE and JOAB O. BOSWORTH, citizens of the United States, residing at Denver, in the county of Arapahoe and State of Colorado, have invented certain new and useful Improvements in Brick and other Presses; and we do hereby declare the following to be a full, clear, and exact description of the invention, such as will enable others skilled in the art to which it appertains to make and use the same, reference being had to the accompanying drawings, and to letters or figures of reference marked thereon, which form a part of the specification.

This invention relates to a new arrangement of toggles in presses; and it consists, mainly, in a peculiar arrangement of the central joints of the toggles, applicable more particularly to brick and other presses, whereby certain advantages are obtained, as will be hereinafter explained.

In the accompanying drawings, Figure 1 represents a vertical section of a brick-press constructed according to my invention; Fig. 2, an end view, partly in section; Fig. 3, a detail showing the lower toggle-block detached, and Fig. 4 a modification showing the main feature of my invention applied to a crucible-press.

A represents the frame of the machine, mounted on rollers on one end for convenience in moving the machine. At the bottom of this frame is the fixed toggle-block B, (shown detached in Fig. 3,) in which the bottom ends of the toggles are pivoted, as shown in Figs. 1 and 2. This block may be cast in one piece, as shown in Fig. 3, or it may be formed of a square bar, $b$, with round ends $b'$ and a separate cast socket-piece, $b''$, resting on top of the bar, and having lugs $b'''$ passing down and embracing each side of the bar. This socket-piece may be secured to the bar in any convenient manner, but I prefer to fasten the two together by means of a yoke, $c$, passed under the bar and up on each side of it, through notches or holes in the base of the socket-piece, and then, by screwing nuts on the ends of the yoke, firmly secure both bar and socket-piece together. This toggle-block is so proportioned that the square ends of the bar $b$ rest in correspondingly-shaped recesses J in the frame A, the round ends $b'$ projecting through on each side to receive the strain in rods C C, which carry a cap, D, secured to the rods by nuts $d\ d$.

Pivoted in the block $b''$ are the lower bars of two sets of toggles, each toggle being formed of a long bar, E, and a short bar, E', the right-hand set of toggles, as shown in Fig. 1, having the longest bar at the bottom, and the left-hand toggles the longest bar at top. The right-hand toggles are connected by a pin, $e$, passing through both toggles, to connecting-rods F F, and the left-hand toggles, by a similar pin, to connecting-rods F' F'. Both the rods, F F and F' F', are pivoted to the top and bottom, respectively, of the segment G, one of the rods of each pair being pivoted to one side of the segment and the other rod of the pair to the other side thereof. These rods may be connected together at the toggle ends, but I prefer to make them of separate bars, with a sleeve, H, between them, as shown in Fig. 2; or, in lieu of two rods to each pair of toggles, a single central rod may be employed, which may either be pivoted to one side of the segment, or their ends may be slotted and embrace the segment on both sides; but, for strength, I prefer the separate bar, as shown in the drawings.

In the upper part of the press is shown the upper toggle-block, I, which slides in recesses J', cast or otherwise formed in the sides of the frame, and is pivoted to the upper ends of the toggles, as shown. Resting on the top of this upper toggle-block is the cross-head K, which has a shank, $k$, sliding through a hole in the upper toggle-block, and is connected to a foot-lever, L, through the medium of the lever M and rod N, by means of which the cross-head can be raised by the pressure of the foot on the lever L, and carry with it the follower O, which is fastened to the cross-head by screws.

The segment G is securely fastened to a shaft, P, having bearings in the sides of the frame.

At Q is a pinion, mounted on a shaft, R, and meshing with the teeth of segment G. Attached to this shaft R is a lever, S, which, however, may be changed for a hand-wheel, as shown in dotted lines, or both a lever and hand-wheel may be secured to the shaft at opposite ends, so that either may be used at the will of the operator.

The operation is as follows: The cap and straining-bars being swung to one side, the material to be pressed is inserted in the box and the cap replaced, when the press is put in operation by pressing on the lever S, or by turning the hand-wheel, when the pinion Q will turn the segment, thus pushing the rod F in one direction and drawing the rods F' in the opposite direction, and straightening the toggles, which will force the cross-head and follower upward and exert an immense pressure upon the article being pressed. By reversing the handle or wheel the motion of the various parts is also reversed until the upper toggle-block rests on the bottom of the recess, when the lower toggle-block will rise slightly in its recess, carrying with it the straining-rods C C and cap D, whereby the latter may be readily swung away from over the box, and the article pressed may be ejected therefrom by pressing the foot on the lever L, thereby raising the cross-head and follower.

By the above construction there is sufficient room between the sets of toggles, as shown in Figs. 1 and 2, for the shank $k$ and lever M; but if these devices are not required a single set of toggles may be employed in place of the two right-hand toggles, in which case the connecting-rods F should be attached one on each side of the toggle. Instead of using the geared segment and pinion the connecting-rods may be attached to a T-shaped lever, as shown in Fig. 4, if but small power is required to be exerted.

In Fig. 4 I have shown a modification (in outline) designed to be used for a crucible-press. In this case the upper toggle-block is a fixture in the press, and the lower toggle-block carries a guide-rod, T, (moving in suitable guides, not shown,) to which is attached a plunger, U. As shown in Fig. 4, there are but two toggles, instead of two pairs, as in Figs. 1 and 2, and the rods are connected to the short ends of a T-shaped lever, instead of being connected to a segment, as in Fig. 1.

In lieu of operating the press by a hand-lever or wheel, I prefer, in some cases, to employ steam or other power by means of a shaft driven in any ordinary manner, having on its end a crank connected to the lever by a pitman, as shown in dotted lines in Fig. 4. If preferred, a similar device may be connected to the segment or lever in Fig. 1; or the crank (shown in dotted lines in Fig. 4) may be turned by hand by means of a handle connected directly to the pin on said crank; or another crank and handle may be attached to the shaft carrying said crank. Any of these devices may be employed at will, or any other device known to mechanics may be used for giving motion to the rods F F, without varying from the spirit of my invention, which consists, mainly, in the peculiar construction and arrangement of the joints of the toggles and the rods connecting them to the moving mechanism, which arrangement of the toggle-joints allows of the use of rods connected to the operating mechanism on one side of the machine for operating a pair of toggles without the rods interfering with each other, as they would were the bars of the toggles all of equal length, whereby a press of great power, that is easy in operation, simple in construction, and not liable to get out of order, is obtained.

What we claim as new is—

1. A pair of toggles having their bending joints at different distances from the fixed or moving blocks to which their ends are pivoted, in combination with suitable operating devices, substantially as described.

2. A pair of toggles formed of bars of unequal lengths, and having their bending joints at different distances from the fixed or moving blocks to which their ends are pivoted, in combination with suitable operating devices, substantially as described.

3. The combination of a pair of toggles with a pair of rods, each rod being pivoted to a different toggle, and both connected, on the same side of the toggles, to an operating device, constructed to push one rod and pull the other, substantially as described.

4. The combination of a pair of toggles having their bending joints at different distances from the fixed or moving blocks to which their ends are pivoted, with a pair of rods, each rod being pivoted to a different toggle, and both connected, on the same side of the toggles, to an operating device constructed to push one rod and pull the other, substantially as described.

5. The combination of a pair of toggles formed of bars of different length, and having their bending joints at different distances from the fixed and moving blocks to which their ends are pivoted, with a pair of rods, each rod being pivoted to a separate toggle, and both connected, on the same side of the toggles, to a device constructed to push one rod and pull the other, substantially as described.

6. The combination of a pair of toggles with the rods F F', said rods moving simultaneously in opposite directions, and rocking segment G, connected at opposite sides of its center to the rods F F', connected to a suitable operating device, substantially as described.

7. The combination of a pair of toggles having their bending joints at different distances from the moving or fixed blocks to which their ends are attached, with the rods F F', segment G, and a suitable operating device connected to said segment, substantially as described.

8. The combination of a pair of toggles formed of bars of unequal lengths, and having their bending joints at different distances from the fixed or moving blocks to which their ends are attached, with the rods F F', segment G, and a suitable device for operating said segment, substantially as described.

9. The combination of a pair of toggles with the rods F F', moving in opposite directions simultaneously, rocking segment G, connected at opposite sides of its center to the rods F F', pinion Q, and a suitable device for giving motion to said pinion, all substantially as described.

10. The combination of a pair of toggles having their bending joints at different distances from the fixed or moving blocks to which their ends are attached, with the rods F F', segment G, pinion Q, and a suitable device for giving motion to said pinion, all substantially as described.

11. The combination of a pair of toggles formed of bars of different lengths, and having their bending joints at different distances from the fixed or moving blocks to which their ends are attached, with rods F F', segment G, pinion Q, shaft R, and lever S, all constructed and arranged substantially as shown and described.

12. The combination, with a pair of toggles and operating mechanism, substantially as described, of the frame A, provided with recesses J J', sliding block I, block B, set in open recesses J and having round ends, straining-rods C, and cap D, as and for the purposes set forth.

13. The combination, with a pair of toggles and mechanism, substantially as described, for operating the same, of the frame A, provided with recesses J J', sliding block I, square bar $b$, set in recesses J', and having round ends $b'$, socket-pieces $b''$, resting on said bars, and having lugs $b'''$ passing down on each side thereof, straining-bar C, moving on the round ends of bar $b$, and cap D, all constructed and arranged substantially as described, and for the purpose specified.

In testimony whereof we affix our signatures in presence of two witnesses.

FRANCIS M. CASE.
JOAB O. BOSWORTH.

Witnesses:
C. E. BURLINGAME,
WM. M. ROWORTH.